UNITED STATES PATENT OFFICE 1,938,031

META-HYDROXYL-PHENYL-ARYLAMINO CARBOXYLIC ACIDS

Leopold Laska and Oskar Haller, Offenbach-on-the-Main, Germany, assignors to General Aniline Works, Inc., New York, N. Y., a corporation of Delaware No Drawing. Application November 14, 1929, Serial No. 407,274, and in Germany December 1, 1928

6 Claims. (Cl. 260—109)

Our invention relates to new meta-hydroxyphenylarylamine carboxylic acids.

We have found that new meta-hydroxyphenylarylamine carboxylic acids are obtained by heating an alkali salt of a meta-hydroxyphenylarylamine of the formula:

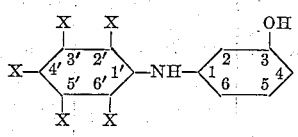

wherein two X's are hydrogen, and the other X's stand for hydrogen, halogen, alkyl, alkoxy or aryloxy, with carbon dioxide at an elevated pressure. The reaction may be illustrated by the following probable equation:

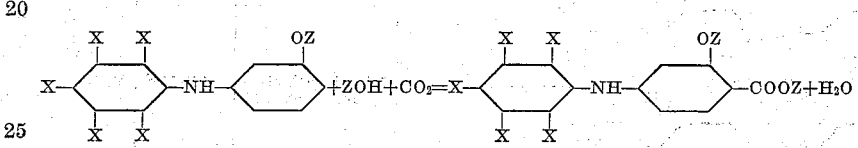

wherein two X's are hydrogen, and the other X's stand for hydrogen, halogen, alkyl, alkoxy or aryloxy, and Z means an alkali metal.

The position of the carboxylic acid group of these 3 - hydroxy - phenylarylamine-carboxylic acids is not exactly known. But as the new acids yield, with ferric chloride, a red to violet coloration, it is assumed that the carboxylic group is in ortho-position to the hydroxyl group and probably in para-position to the NH-group.

The starting materials of our process may be obtained, for instance, by condensing resorcinol with aromatic amines of the benzene series, that is, with aniline and its homologues, alkoxyanilines, aryloxyanilines and the halogen substitution products of these compounds.

The new carboxylic acids are valuable intermediate products for the manufacture of dyestuffs. They are distinguished by a remarkable stability, especially when compared with the carboxylic acids obtained according to the U. S. Patents No. 427,564 and 427,565 these acids being derived from meta-aminophenol and meta-alkyl-aminophenols. Whereas meta-aminophenolcarboxylic acid splits off the carboxylic acid group when heated in a moist state on the water-bath, the 3-arylaminophenol-carboxylic acids obtained by the present process are not decomposed even above their melting point.

In order to further illustrate our invention the following examples are given, the parts being by weight and all temperatures in centigrade degrees, but we wish it to be understood that we are not limited to the particular products or reaction conditions mentioned therein.

Example

In autoclave provided with a stirrer, 1850 parts of m-hydroxy-diphenylamine are dissolved in 560 parts of caustic potash and 3000 parts of water; the water is distilled off in vacuo to complete dryness. After cooling, carbon dioxide is introduced up to a pressure of 5–10 atmospheres and the temperature is raised to about 150–170°. After heating at this temperature for 16 hours, the cooled reaction mass is worked up by dissolving it in hot water, filtering the solution containing the potassium salt of the formed carboxylic acid and precipitating the carboxylic acid by means of dilute hydrochloric acid. The raw carboxylic acid may be purified by dissolving it in a dilute solution of sodium carbonate or acetate and again precipitating it by the addition of an acid. After recrystallization from dilute alcohol it melts at 180–181°. Its alcoholic solution yields, when mixed with a dilute ferric chloride solution, an intensive cherry-red color.

When starting from the sodium salt of the m-hydroxy-diphenylamine, the process may be carried out in an analogous manner.

The following table gives further data relating to other new acids prepared in a quite analogous manner.

| Compound | Prepared from the condensation product from resorcinol and | Melting point | Color with ferric chloride |
|---|---|---|---|
| 3-hydroxy-2'-methyldiphenylamine carboxylic acid $\text{CH}_3\text{-}C_6H_4\text{-NH-}C_6H_3(\text{OH})\text{-COOH}$ | o-toluidine | 180–182° | Violet |
| 3-hydroxy-3'-methyldiphenylamine carboxylic acid $\text{CH}_3\text{-}C_6H_4\text{-NH-}C_6H_3(\text{OH})\text{-COOH}$ | m-toluidine | 176–177° | Violet |
| 3-hydroxy-4'-methyldiphenylamine carboxylic acid $\text{CH}_3\text{-}C_6H_4\text{-NH-}C_6H_3(\text{OH})\text{-COOH}$ | p-toluidine | 185–186° | Violet |
| 3-hydroxy-2'-methoxydiphenylamine carboxylic acid $\text{OCH}_3\text{-}C_6H_4\text{-NH-}C_6H_3(\text{OH})\text{-COOH}$ | o-anisidine | 199–200° | Violet |
| 3-hydroxy-4'-methoxydiphenylamine carboxylic acid $\text{CH}_3\text{O-}C_6H_4\text{-NH-}C_6H_3(\text{OH})\text{-COOH}$ | p-anisidine | 176–177° | Violet |
| 3-hydroxy-2'-chloro-diphenylamine carboxylic acid $\text{Cl-}C_6H_4\text{-NH-}C_6H_3(\text{OH})\text{-COOH}$ | o-chloroaniline | 198° | Violet |
| 3-hydroxy-3'-chloro-diphenylamine carboxylic acid $\text{Cl-}C_6H_4\text{-NH-}C_6H_3(\text{OH})\text{-COOH}$ | m-chloroaniline | 189–190° | Reddish violet |
| 3-hydroxy-4'-chloro-diphenylamine carboxylic acid $\text{Cl-}C_6H_4\text{-NH-}C_6H_3(\text{OH})\text{-COOH}$ | p-chloroaniline | 188–190° | Violet |
| 3-hydroxy-2',4'-dimethyl-diphenylamine carboxylic acid $\text{CH}_3,\text{CH}_3\text{-}C_6H_3\text{-NH-}C_6H_3(\text{OH})\text{-COOH}$ | 1,3 dimethyl-4-amino-benzene | 175° | Violet |
| 3-hydroxy-2',5'-dimethyl-diphenylamine carboxylic acid $\text{CH}_3,\text{CH}_3\text{-}C_6H_3\text{-NH-}C_6H_3(\text{OH})\text{-COOH}$ | 1,4 dimethyl-2-amino-benzene | 175–176° | Violet |
| 3-hydroxy-3'-methyl-4'-methoxydiphenylamine carboxylic acid $\text{CH}_3\text{O-},\text{CH}_3\text{-}C_6H_3\text{-NH-}C_6H_3(\text{OH})\text{-COOH}$ | 2-methyl-4-amino-anisole | 165° | Dirty violet |
| 3-hydroxy-2'-methyl-4'-chloro-diphenylamine carboxylic acid $\text{Cl-},\text{CH}_3\text{-}C_6H_3\text{-NH-}C_6H_3(\text{OH})\text{-COOH}$ | 5-chloro-2-amino-toluene | 180–181° | Cherry-red |
| 3-hydroxy-2'-methyl-5'-chloro-diphenylamine carboxylic acid $\text{CH}_3,\text{Cl-}C_6H_3\text{-NH-}C_6H_3(\text{OH})\text{-COOH}$ | 4-chloro-2-amino-toluene | 208–210° | Violet |
| 3-hydroxy-3'-methyl-4'-chloro-diphenylamine carboxylic acid $\text{Cl-},\text{CH}_3\text{-}C_6H_3\text{-NH-}C_6H_3(\text{OH})\text{-COOH}$ | 6-chloro-3-amino-toluene | 195–197° | Cherry-red |

| | Prepared from the condensation product from resorcinol and | Melting point | Color with ferric chloride |
|---|---|---|---|
| 3-hydroxy-4'-methyl-3'-chloro-diphenylamine carboxylic acid 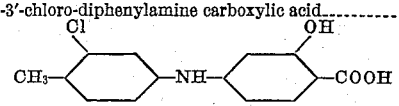 | 2-chloro-4-amino-toluene | 190° | Cherry-red |
| 3-hydroxy-2'.4'-dichlorodiphenylamine carboxylic acid 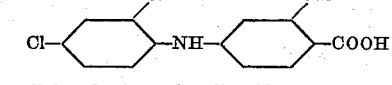 | 2.4-dichloro-aniline | 215° | Cherry-red |
| 3-hydroxy-3'.4'-dichloro-diphenylamine carboxylic acid 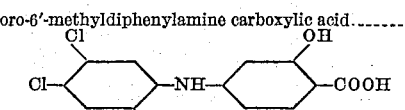 | 3.4-dichloro-aniline | 199° | Violet |
| 3-hydroxy-3'.4'-dichloro-6'-methyldiphenylamine carboxylic acid 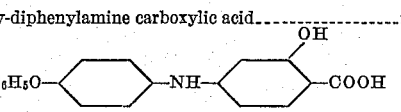 | 4.5-dichloro-2-amino-toluene | 203° | Cherry-red |
| 3-hydroxy-4'-phenoxy-diphenylamine carboxylic acid 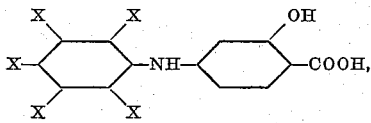 | p-amino-diphenyl-ether | 189° | Violet |

We claim:

1. As new compounds the meta-hydroxydiphenylamine carboxylic acids of the probable general formula:

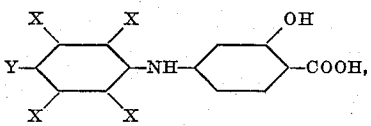

wherein two X's are hydrogen, and the other X's stand for hydrogen, halogen, alkyl, alkoxy or aryloxy, which compounds are in a dry state crystallized substances being soluble in alkalies, yielding a reddish to violet color by the addition of ferric chloride to their alcoholic solution.

2. As new compounds the meta-hydroxydiphenylamine carboxylic acids of the probable general formula:

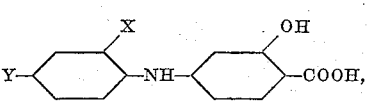

wherein Y represents halogen, an alkyl, alkoxy or aryloxy group, two X's are hydrogen and the other X's stand for hydrogen, halogen, alkyl or alkyloxy, which compounds are in a dry state crystallized substances being soluble in alkalies, yielding a reddish to violet color by the addition of ferric chloride to their alcoholic solution.

3. As new compounds the meta-hydroxydiphenylamine carboxylic acids of the probable general formula:

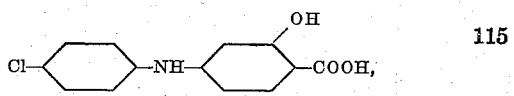

wherein Y represents chlorine, a methyl, methoxy or aryloxy group, and X represents hydrogen, chlorine, a methyl, methoxy or aryloxy group, which compounds are in a dry state crystallized substances being soluble in alkalies, yielding a reddish to violet color by the addition of ferric chloride to their alcoholic solution.

4. As a new compound the 3-hydroxy-4'-chloro-diphenyl-amine-4-carboxylic acid corresponding to the following probable formula:

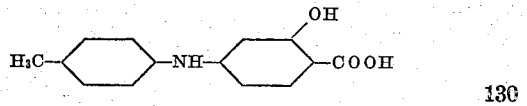

which compound is in a dry state a crystallized substance melting at 188–190°, soluble in alkalies, yielding a violet color by the addition of ferric chloride to its alcoholic solution.

5. As a new compound, the 3-hydroxy-4'-methyl-diphenyl-amine-4-carboxylic acid corresponding to the following probable formula:

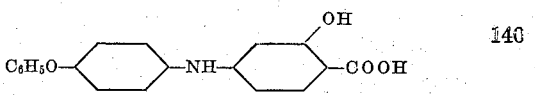

which compound is in a dry state a crystallized substance melting at 185° C. to 186° C. soluble in alkalies, yielding a violet color by the addition of ferric chloride to its alcoholic solution.

6. As a new compound, the 3-hydroxy-4'-phenoxy-diphenyl-amine-4-carboxylic acid corresponding to the following probable formula:

which compound is in a dry state a crystallized substance melting at 189° C., soluble in alkalies, yielding a violet color by the addition of ferric chloride to its alcoholic solution.

LEOPOLD LASKA.
OSKAR HALLER.